(12) United States Patent
Gaitonde et al.

(10) Patent No.: US 12,043,380 B2
(45) Date of Patent: Jul. 23, 2024

(54) PANEL ASSEMBLY

(71) Applicant: Airbus Operations Limited, Bristol (GB)

(72) Inventors: John Martin Gaitonde, Bristol (GB); Chris Heaysman, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 73 days.

(21) Appl. No.: 17/981,861

(22) Filed: Nov. 7, 2022

(65) Prior Publication Data

US 2023/0143892 A1    May 11, 2023

(30) Foreign Application Priority Data

Nov. 8, 2021 (GB) ..................................... 2115993

(51) Int. Cl.
*B64C 3/18* (2006.01)
*B64C 3/26* (2006.01)

(52) U.S. Cl.
CPC .............. *B64C 3/187* (2013.01); *B64C 3/182* (2013.01); *B64C 3/26* (2013.01)

(58) Field of Classification Search
CPC ........... B64C 3/187; B64C 3/182; B64C 3/26; B64C 1/064; B64C 3/18
See application file for complete search history.

(56) References Cited

U.S. PATENT DOCUMENTS

| | | | |
|---|---|---|---|
| 7,879,276 B2 | 2/2011 | Guzman et al. | |
| 8,167,245 B1 | 5/2012 | Koehler et al. | |
| 8,490,920 B2 | 7/2013 | Karem | |
| 9,061,754 B2* | 6/2015 | Matheson et al. | |
| 9,944,378 B2 | 4/2018 | Alby et al. | |
| 2009/0057487 A1 | 3/2009 | Velicki et al. | |
| 2010/0129589 A1 | 5/2010 | Senibi et al. | |
| 2016/0152317 A1* | 6/2016 | Reeves | |
| 2016/0207607 A1* | 7/2016 | Charles et al. | |
| 2022/0024556 A1* | 1/2022 | Heaysman et al. | ..... B64C 1/061 |

FOREIGN PATENT DOCUMENTS

| | | |
|---|---|---|
| DE | 10 2008 013365 | 10/2009 |
| EP | 2 397 681 | 12/2011 |
| EP | 2 436 595 A2 | 4/2012 |
| EP | 2 436 595 A3 | 8/2013 |
| EP | 3 702 266 | 9/2020 |
| GB | 2 516 830 | 2/2015 |
| WO | 2011/001050 | 1/2011 |
| WO | 2020/229501 | 11/2020 |

OTHER PUBLICATIONS

Extended European Search Report for Application No. EP 22205925.5, eight pages, dated Mar. 16, 2023.
Search Report for GB2115993.4, dated Apr. 27, 2022, 4 pages.

* cited by examiner

*Primary Examiner* — Justin M Benedik
(74) *Attorney, Agent, or Firm* — Nixon & Vanderhye P.C.

(57) ABSTRACT

A panel assembly is disclosed having a panel, a beam attached to the panel, and a plurality of stiffeners attached to the panel. Each stiffener includes a respective bridge which crosses over the beam at an intersection from a first side of the beam to a second side of the beam. Each bridge has an outer surface facing away from the panel and an inner surface facing towards the panel. The inner surface of each bridge deviates away from the panel to form a recess at the intersection, and the outer surface of each bridge deviates away from the panel to form a protrusion at the intersection.

20 Claims, 6 Drawing Sheets

PANEL ASSEMBLY

CROSS RELATED APPLICATION

This application claims priority to United Kingdom Patent Application GB 2115993.4 filed Nov. 8, 2021, the entire contents of which is hereby incorporated by reference.

FIELD OF THE INVENTION

The present invention relates to a panel assembly.

BACKGROUND OF THE INVENTION

Composite stiffeners have a variety of different forms. One well-known form is a so-called "blade" stringer. Blade stringers have a relatively high aspect ratio (depth/width) which can result in various disadvantages: for example the free edge of the blade may be prone to damage, and the blade may be prone to buckling.

Another form is an "omega" or "hat" stiffener. Hat stiffeners have a relatively low aspect ratio (depth/width) which can avoid the disadvantages of blade stringers, but can also introduce different problems: for instance increased weight, and increased pitch between the stiffeners.

An example of a "hat" stiffener is disclosed in US2010129589. In one example, composite material is laid up over foam which is placed into an inside mold line tool. Then fuselage skin is placed or laid up onto the composite material, foam, and inside mold line tool. A problem with this manufacturing process is that the stiffener must be assembled on the inside mold line tool, which can make the process complex and difficult to automate.

An aircraft panel assembly disclosed in WO2020/229501 comprises a panel, and a plurality of stiffeners on the panel. Each stiffener has an attachment part attached to the panel and a structural part spaced apart from the panel. A rib foot beam crosses the stiffeners at a series of intersections. At each intersection the rib foot beam is located between the panel and the structural part of a respective one of the stiffeners.

SUMMARY OF THE INVENTION

A first aspect of the invention provides a panel assembly comprising: a panel; a beam attached to the panel; and a plurality of stiffeners attached to the panel, wherein each stiffener comprises a respective bridge which crosses over the beam at an intersection from a first side of the beam to a second side of the beam, each bridge has an outer surface facing away from the panel and an inner surface facing towards the panel, the inner surface of each bridge deviates away from the panel to form a recess at the intersection, and the outer surface of each bridge deviates away from the panel to form a protrusion at the intersection.

Optionally the inner surface of each bridge follows a curved path as it deviates away from the panel.

Optionally each bridge has a bridge depth between its outer surface and its inner surface; and each stiffener comprises: a first stiffener portion which is attached to the panel on the first side of the beam, the first stiffener portion having a first stiffener portion depth; and a second stiffener portion which is attached to the panel on the second side of the beam, the second stiffener portion having a second stiffener portion depth, wherein the bridge depth at an apex of the protrusion is substantially the same as the first and second stiffener portion depths.

Optionally each stiffener comprises a core, and a shell surrounding the core.

Optionally the shell is formed from a fibre material.

Optionally the core comprises: first and second battens arranged side by side; and a spacer between the battens, wherein the stiffener extends in a lengthwise direction, and the battens and the spacer have respective lengths which extend in the lengthwise direction of the stiffener.

Optionally each shell comprises a foot with a first foot portion which is attached to the panel on the first side of the beam, a second foot portion which is attached to the panel on the second side of the beam, and a bridge foot portion which deviates away from the panel at the bridge, wherein an inner surface of the bridge foot portion provides the inner surface of the bridge.

Optionally each stiffener comprises a foot, and each foot comprises a first foot portion which is attached to the panel on the first side of the beam, a second foot portion which is attached to the panel on the second side of the beam, and a bridge foot portion which deviates away from the panel at the bridge, wherein the inner surface of the bridge is an inner surface of the bridge foot portion.

Optionally each protrusion comprises a pair of ramps, and an apex between the ramps.

Optionally each ramp is rounded where it meets the apex.

Optionally the panel assembly further comprises a first bridge support structure between the bridge and the panel on the first side of the beam; and a second bridge support structure between the bridge and the panel on the second side of the beam.

Optionally each bridge comprises reinforcement fibres which extend continuously along the bridge and cross over the beam at the intersection from the first side of the beam to the second side of the beam. Optionally at least some of said reinforcement fibres deviate away from the panel at each end of the bridge.

Optionally the beam comprises a plurality of beam recesses, and the inner surface of each bridge is seated in a respective one of the beam recesses.

Optionally each bridge has a pair of side walls connecting the outer surface to the inner surface, and the beam recess has side walls which contact the side walls of the bridge.

Optionally each stiffener is adhered to the panel on each side of the beam.

Optionally the beam is adhered to the panel.

Optionally the inner surface of each bridge is adhered to the beam.

Optionally each rib foot beam has a width which increases at each intersection so that a width of the rib foot beam at the intersections is greater than a width of the rib foot beam between the intersections.

A second aspect of the invention provides an aircraft wing comprising a panel assembly according to the first aspect.

Optionally the panel is a first cover panel of the aircraft wing; and the aircraft wing further comprises: a second cover panel; and a rib connecting the first cover panel to the second cover panel, wherein the beam is a rib foot beam which is attached to the rib between the intersections.

Optionally the rib foot beam is attached to the rib between the intersections by fasteners.

A third aspect of the invention provides an aircraft comprising a panel assembly according to the first aspect.

A fourth aspect of the invention provides an aircraft wing comprising an upper cover panel; a lower cover panel; ribs connecting the upper cover panel to the lower cover panel; and a plurality of stiffeners attached to the upper and lower cover panels, wherein each rib is joined to each cover panel by a respective rib/cover connection arrangement, at least one of the rib/cover connection arrangements comprises a rib foot beam which crosses the stiffeners at a series of intersections and is attached to a respective one of the ribs between the intersections, wherein each stiffener deviates away from the panel at each intersection to form a respective protruding bridge which crosses over the rib foot beam at the intersection.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
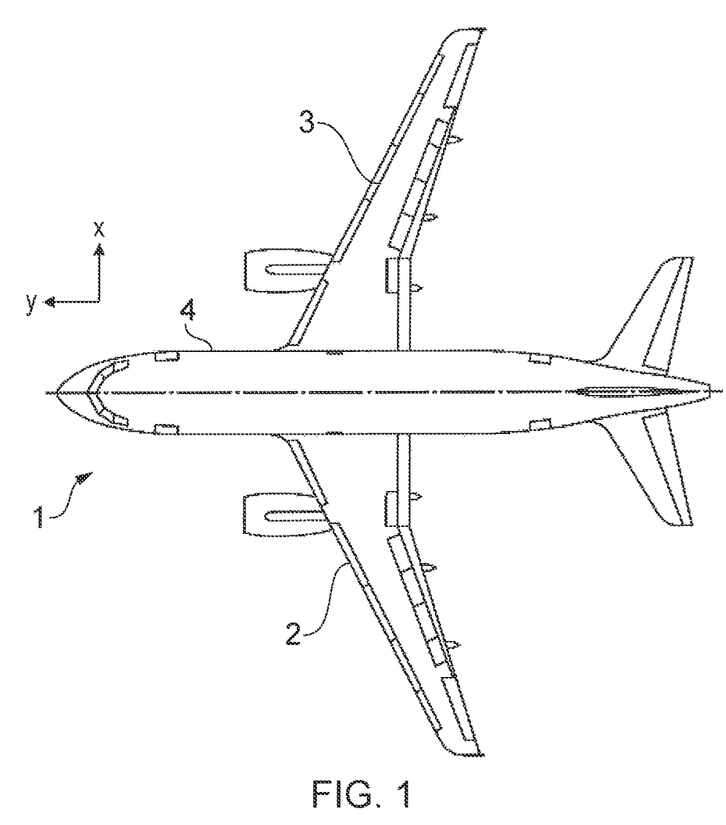
FIG. 1 shows an aircraft.

FIG. 1 shows an aircraft 1 with port and starboard wings 2, 3. Each wing has a cantilevered structure with a length extending in a spanwise direction 42 from a root to a tip, the root being joined to an aircraft fuselage 4. The wings 2, 3 are similar in construction so only the starboard wing 3 will be described in detail with reference to FIGS. 2 and 3.

Figure 2:
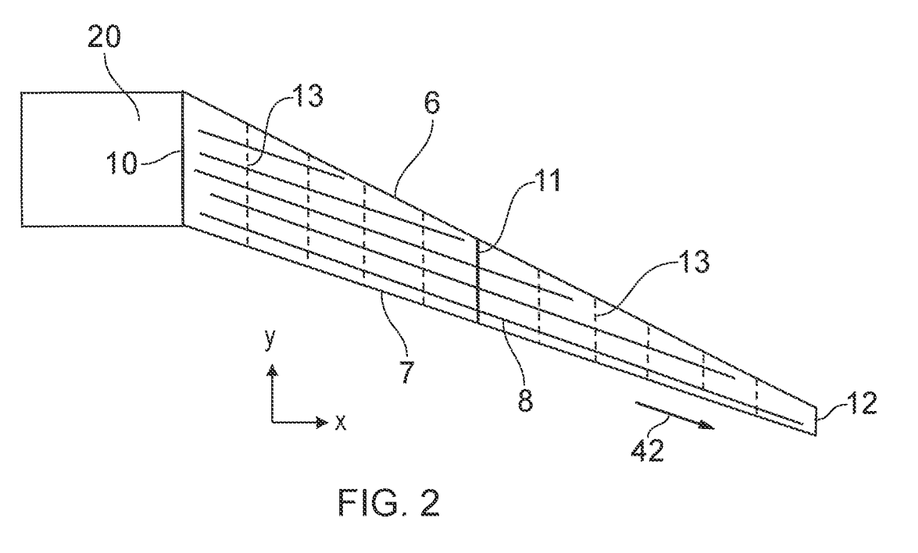
FIG. 2 shows a starboard wing of the aircraft.
Figure 3:
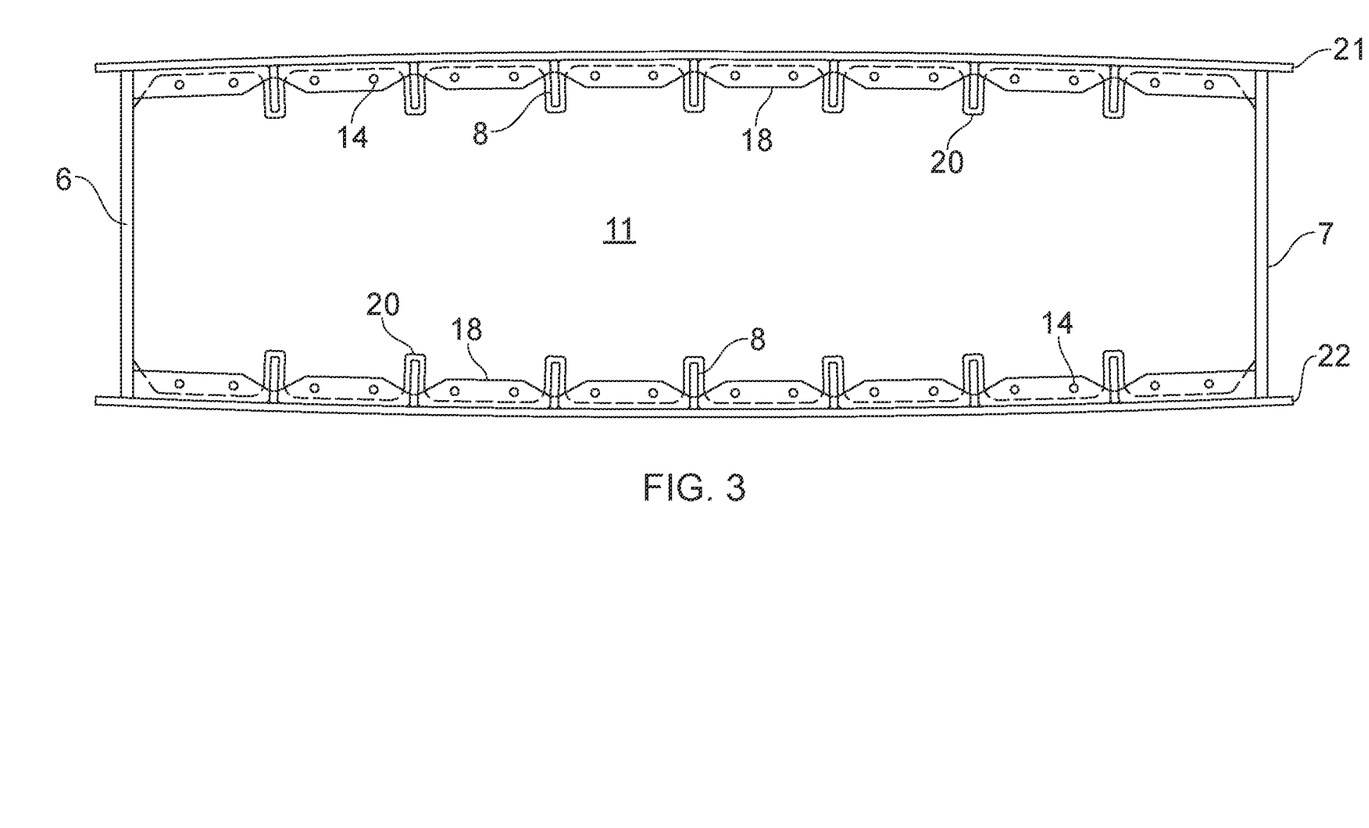
FIG. 3 is a sectional view of a wingbox.

The main structural element of the wing 3 is a wing box formed by upper and lower cover panels 21, 22 and front and rear spars 6, 7 shown in cross-section in FIG. 3. The cover panels 21, 22 and spars 6, 7 are each Carbon Fibre Reinforced Polymer (CFRP) laminate components. Each cover panel has a curved aerodynamic surface (the upper surface of the upper cover panel 21 and the lower surface of the lower cover panel 22) over which air flows during flight of the aircraft. Each cover panel also has an inner surface carrying a series of stiffeners 8 extending in the spanwise direction 42. Each cover panel carries a large number of stiffeners 8, only five of which are shown in FIG. 2 and only seven of which are shown in FIG. 3 for purposes of clarity. A much larger number of stiffeners may be applied across the chord of the wing. Each stiffener 8 is joined to one cover panel but not the other. In the case of an aircraft wing cover panel, the stiffeners 8 are commonly referred to as stringers, but the term "stiffeners" will be used below.

The wing box also has a plurality of transverse ribs, each rib being joined to the cover panels 21, 22 and the spars 6, 7. The ribs include an inner-most inboard rib 10 located at the root of the wing box, and a number of further ribs spaced apart from the inner-most rib along the length of the wing box. The wing box is divided into two fuel tanks: an inboard wing fuel tank bounded by the inboard rib 10, a mid-span rib 11, the cover panels 21, 22 and the spars 6, 7; and an outboard wing fuel tank bounded by the mid-span rib 11, an outboard rib 12 at the tip of the wing box, the cover panels 21, 22 and the spars 6, 7.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2, the stiffeners 8 stop short of the inboard rib 10 and the outboard rib 12, but pass through the baffle ribs 13 and the mid-span rib 11.

Each rib 10, 11, 12, 13 connects the upper cover panel 21 to the lower cover panel 22, and FIG. 3 shows the upper and lower rib/cover connection arrangements for the rib 11 by way of example. A rib foot beam 18 is adhered to the inner surface of each cover panel 21, 22, and attached to the rib 11 between the stiffeners 8 by fasteners 14 (such as bolts or rivets) which pass through the rib 11 and the rib foot beam 18. The stiffeners 8 pass through mouse-hole openings 20 in the rib 11.

Each stiffener 8 crosses over the rib foot beam 18 at an intersection. At each intersection the rib foot beam 18 is located between the panel 21, 22 and a respective one of the stiffeners 8.

As noted above, the upper and lower cover panels 21, 22 provide the upper and lower walls respectively of a fuel tank. If the fuel tank is over-filled, then large fuel pressure forces can be generated which risk detaching the rib foot beam 18 from the cover panel. The interlocking rib foot/stringer arrangement enables the stiffeners 8 to hold the rib foot beam 18 down against the cover panel and prevent fuel pressure forces from separating the rib foot beam 18 from the cover panel.

The use of a single rib foot beam 18 per rib/cover interface makes the assembly less complex to manufacture. It is also not necessary to align multiple rib feet with each other.

Figure 4:
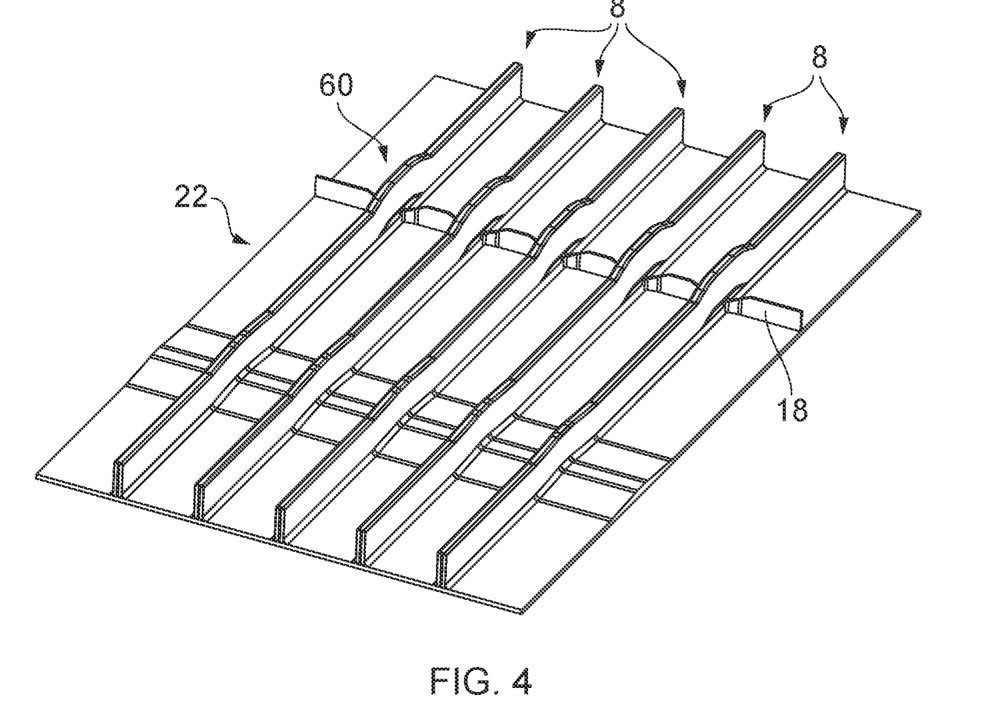
FIG. 4 is an isometric view of a stiffened panel assembly.
Figure 5:
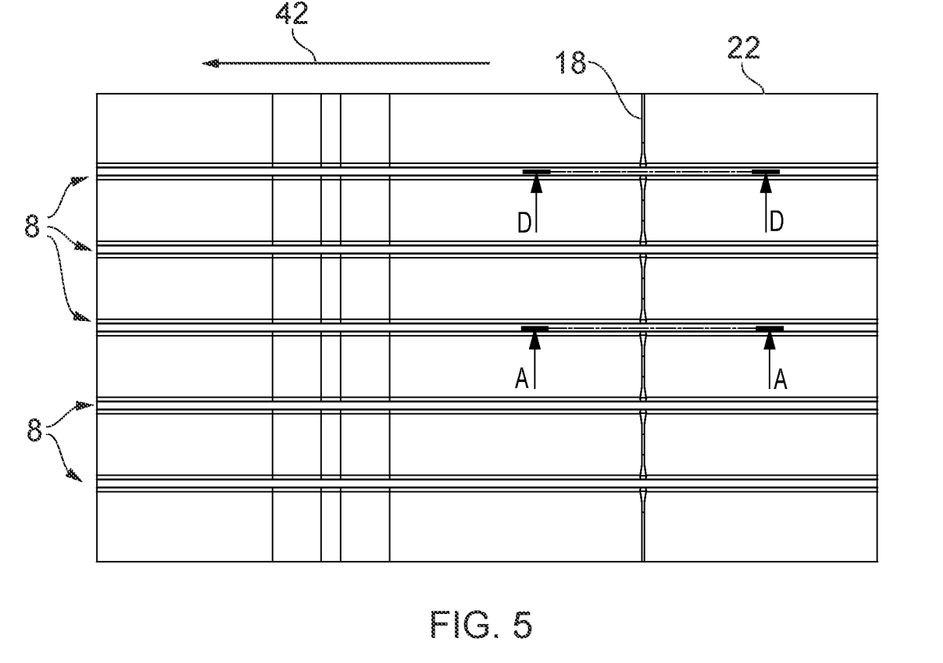
FIG. 5 is a plan view of the assembly of FIG. 4.

FIGS. 4 and 5 show a panel assembly which includes the cover panel 22; a rib foot beam 18; and stiffeners 8 carried on the inner surface of the cover panel 22.

Figure 7:
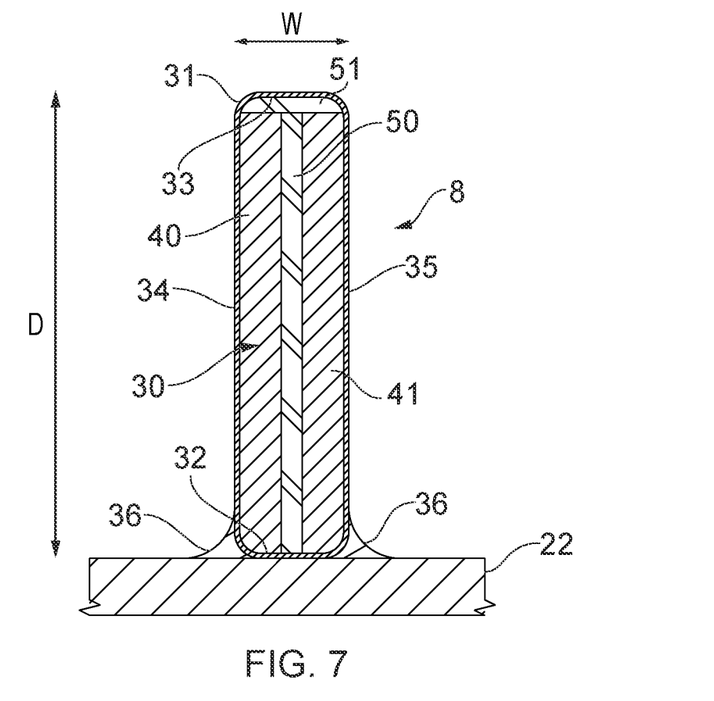
FIG. 7 is a sectional view taken along line C-C in FIG. 6.

FIG. 7 shows one of the stiffeners 8 in cross-section transverse to its length. Each stiffener 8 comprises a core 30 and a shell 31. The shell 31 has a closed cross-section and fully surrounds the core 30 on all sides. In this example the shell 31 has a substantially rectangular outer profile, with rounded corners, although other shapes are possible.

The shell 31 is formed from a fibre-reinforced composite material, such as a carbon-fibre reinforced polymer. For example the shell 31 may comprise a layer of woven fabric which is wrapped around the core 30, or it may be formed by braiding.

The shell 31 comprises a foot 32; a crown 33 opposite the foot 32; a first side wall 34; and a second side wall 35 opposite the first side wall 34. The foot 32 of the shell is adhered to the cover panel 22. Beads of adhesive 36 are applied where the rounded corners of the shell 31 meet the cover panel 22.

Each side wall 34, 35 is longer than the foot 32, viewed in section transverse to the lengthwise direction of the stiffener, as in FIG. 7. Each side wall 34, 35 is also longer than the crown 33, viewed in section transverse to the lengthwise direction of the stiffener, as in FIG. 7.

The first and second side walls 34, 35 are vertical and substantially parallel with each other. The stiffener 8 can be inspected by various non-destructive testing (NDT) techniques. In one example, ultrasound is directed into the stiffener through one of its side walls 34, 35, and the reflections analysed. The vertical orientation of the side walls 34, 35 makes the stiffener easy to inspect in this way, because the ultrasound is directed back to the NDT probe rather than being directed up at an angle by an oblique sidewall as in US2010129589. However, in other embodiments the shell 31 may have a trapezoidal section so that the first and second side walls 34, 35 are not parallel with each other.

The core 30 comprises first and second battens 40, 41; a spacer 50 between the battens; and a cap 51 between the battens 40, 41 and the crown 33 of the shell 31.

The battens 40, 41 are arranged side by side as shown in FIG. 7. Each batten comprises an inner edge facing the panel 22; an outer edge which faces away from the panel 22 and is covered by the cap 51; an inner side facing the other batten; and an outer side facing away from the other batten.

The first batten 40 is adjacent to the first side wall 34, and the second batten 41 is adjacent to the second side wall 35. In this embodiment the outer sides of the battens are in contact with, and optionally adhered to, the side walls 34, 35 of the shell. In other embodiments the outer sides of the battens may be adjacent to the side walls 34, 35 of the shell without being in contact with the side walls 34, 35 of the shell.

In this embodiment the battens 40, 41 have a rectangular cross-section, but this is not essential and other cross-sectional shapes are possible.

Preferably the core 30 has no more than two battens 40, 41. This makes NDT testing easy and simplifies the assembly of the core 30.

The battens 40, 41 are formed from a fibre-reinforced composite material, which may be a carbon-fibre reinforced polymer like the shell 31, or another type of fibre-reinforced composite material.

The spacer 50 is formed from a material which is sufficiently rigid to control the size of the gap between the battens 40, 41. For example the spacer 50 may be formed from a foam material.

The cap 51 is adjacent to, and in contact with, the crown 33 of the shell 31. The cap 51 is formed from a material which is sufficiently rigid to provide impact protection. For example the cap 51 may be formed from a foam material, which may or may not be the same material as the spacer 50.

The battens 40, 41 and the shell 31 are structural components, with a higher mass per unit volume than the spacer 50 and a higher mass per unit volume than the cap 51.

Each stiffener 8 extends in a lengthwise/spanwise direction indicated by an arrow 42 in FIGS. 2, 5, 6, 8 and 9. The lengthwise/spanwise direction 42 is the spanwise direction of the wing 3, extending outwardly towards the tip of the wing.

Figure 8:
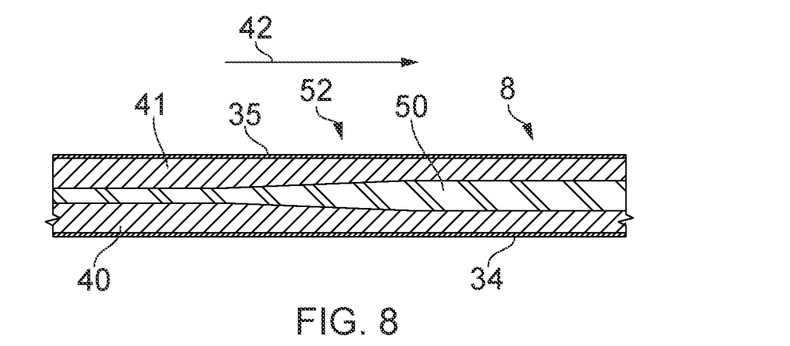
FIG. 8 is a sectional view taken along line B-B in FIG. 6.
Figure 9:
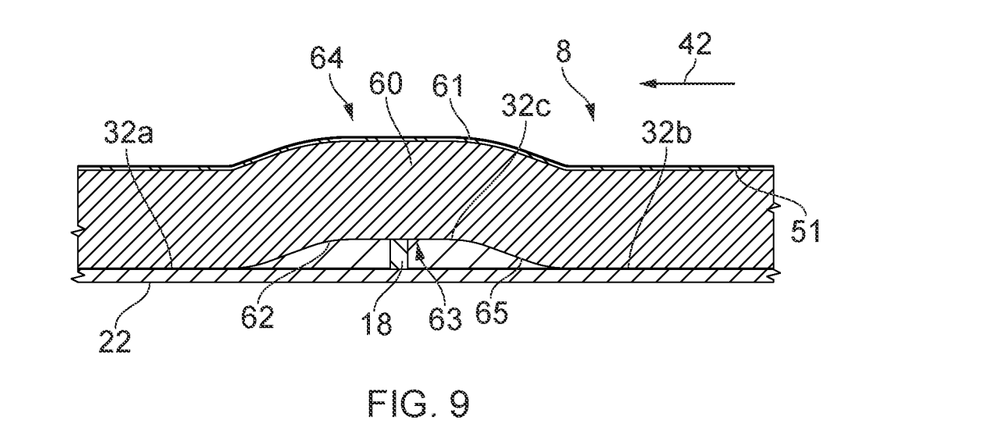
FIG. 9 is a sectional view taken along line A-A in FIG. 5.

The battens 40, 41, the spacer 50 and the cap 51 have respective lengths which extend in the lengthwise/spanwise direction 42 of the stiffener 8 as shown in FIGS. 8 and 9. The battens 40, 41, the spacer 50 and the cap 51 extend continuously along a full length of the stiffener 8, from its inboard end to its outboard end, or at least along a majority of a full length of the stiffener 8.

The battens 40, 41 are spaced apart across the width of the stiffener by a gap, and the spacer 50 fills the gap between the battens. The battens 40, 41 are not in contact with each other at any point along their respective lengths.

The shell 31 has a depth (labelled D in FIG. 7) and a width transverse to the length of the stiffener (labelled W in FIG. 7). The battens 40, 41 are spaced apart across the width of the shell 31, and the depth (D) of the shell is greater than the width (W) of the shell. In this example the aspect ratio (depth/width) is about four, although it may vary.

The relatively high aspect ratio (depth/width), compared with the stiffener in US2010129589, makes the stiffener 8 lighter and easier to arrange on the panel with a small pitch between adjacent stiffeners.

The stiffener 8 also has a relatively low aspect ratio (depth/width), compared with a conventional blade stiffener, which makes it less prone to buckling and less prone to damage at its free edge.

Sandwiching a spacer 50 between the pair of battens 40, 41 enables the width of the stiffener 8 to be tailored by an appropriate selection of the width of the spacer 50.

Sandwiching a spacer 50 between the pair of battens 40, 41 also enables the mechanical properties of the stiffener 8 to be varied along the length of the stiffener, by varying the relative widths of the spacer and the battens.

An example of this is shown in FIG. 8. The battens 40, 41, the spacer 50 and the gap between the battens 40, 41, have respective widths shown in FIG. 8. The widths of the battens 40, 41 decrease in the lengthwise direction 42, i.e. towards the tip of the wing, in a transition region 52 shown in FIG. 8. The widths of the spacer 50, and the gap between the battens, increase in an opposite sense over the same transition region 52.

Thus the overall width of the stiffener—i.e. the width between the side walls 34, 35—does not change in the transition region 52. This ensures that the core 30 has a width and cross-sectional area which does not change substantially along the length of the stiffener, even though the widths and cross-sectional areas of the battens 40, 41 change.

The stringer 8 is manufactured by assembling the core 30 with the spacer 50 between the battens 40, 41; then surrounding the core 30 with the shell 31, for instance by wrapping or braiding the shell 31 around the core 30.

The stiffener 8 may be assembled as a dry-fibre preform, i.e. with the shell 31 and the battens 40, 41 formed from porous dry-fibre material. Alternatively, the stiffener 8 may be assembled as a prepreg, i.e. with the shell 31 and the battens 40, 41 assembled from "prepreg" fibre-reinforced composite material.

The cover panel 22 may laid up on a mold tool as a dry-fibre preform, and the stiffeners 8 may be placed on the panel on the mold tool. Each stiffener 8 may be assembled in prepreg and pre-cured before it is placed on the cover panel 22, or it may be placed on the cover panel 22 as a dry-fibre preform.

The cover panel preform on the mold tool is then infused with a matrix material, which is then cured. The curing of the matrix material adheres the stiffeners 8 to the panel 22. If each stiffener 8 is pre-cured before it is laid onto the panel 22, then the stiffener is adhered to the panel 22 by a co-bonded joint. If each stiffener is placed on the cover panel 22 as a dry-fibre preform, then the stiffener and panel 22 preforms are co-infused by the matrix material, so that each stiffener 8 becomes adhered to the panel 22 by a co-cured joint.

The use of a shell 31 with a closed cross-section which fully surrounds the core 30 is advantageous because it enables the stiffener 8 to be easily assembled and handled "off-line" in an automated process, rather than being laid up "on-line" on a mold tool, as in US2010129589.

Figure 10:
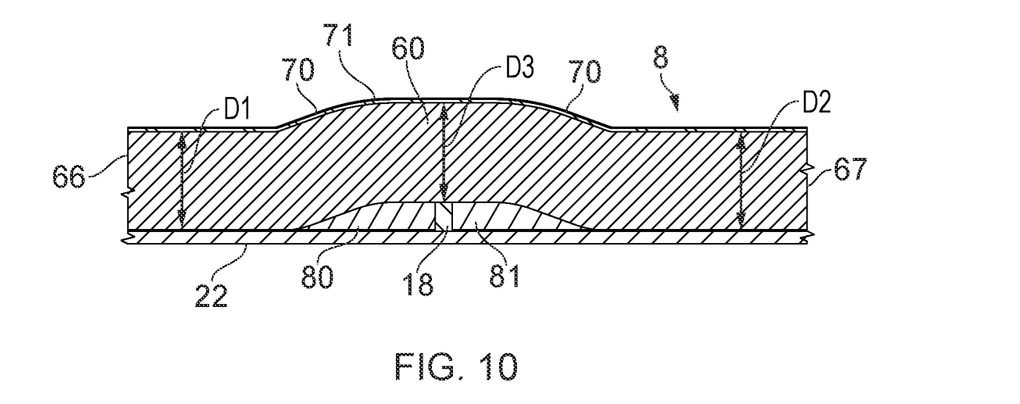
FIG. 10 is a sectional view taken along line D-D in FIG. 5.

As shown in FIGS. 9 and 10, each stiffener 8 comprises a respective bridge 60 which crosses over the rib foot beam 18 at an intersection from a first side of the rib foot beam 18

(on the left-hand side of FIGS. 9 and 10) to a second side of the rib foot beam 18 (on the right-hand side of FIGS. 9 and 10).

Each bridge 60 has an outer surface 61 facing away from the panel 22 and an inner surface 62 facing towards the panel 22. The inner surface 62 of each bridge deviates away from the panel to form a recess 63 at the intersection, and the outer surface 61 of each bridge deviates away from the panel to form a protrusion 64 at the intersection.

Each protrusion 64 comprises a pair of ramps 70, and a flat apex 71 between the ramps. Each ramp 70 is rounded where it meets the apex 71. Other shapes are possible: for instance the apex 71 and/or the ramps 70 may be continuously rounded.

The inner surface 62 of each bridge follows a curved path 65 as it deviates up and away from the panel. Other shapes are possible: for instance the inner surface 62 may be continuously rounded.

As shown in FIG. 10, each stiffener 8 comprises: a first stiffener portion 66 which is attached to the panel 22 on the first side of the rib foot beam 18, the first stiffener portion 66 having a first stiffener portion depth D1; and a second stiffener portion 67 which is attached to the panel on the second side of the rib foot beam 18, the second stiffener portion 67 having a second stiffener portion depth D2. The bridge 60 has a bridge depth D3 between its outer surface 61 and its inner surface 62.

The bridge depth D3 at the apex of the protrusion 64 is substantially the same as the first and second stiffener portion depths D1, D2.

Each shell comprises a foot 32 shown in FIG. 7 which extends continuously across the bridge 60. As shown in FIG. 9, the foot 32 has a first foot portion 32a which is adhered to the panel on the first side of the rib foot beam 18, a second foot portion 32b which is adhered to the panel on the second side of the rib foot beam 18, and a bridge foot portion 32c which deviates away from the panel at the bridge 60. An inner surface of the bridge foot portion 32c provides the inner surface 62 of the bridge 60.

At each intersection a pair of bridge support structures 80, 81 are provided. These comprise a first bridge support structure 80 between the bridge and the panel on the first side of the rib foot beam; and a second bridge support structure 81 between the bridge and the panel on the second side of the rib foot beam. The support structures 80, 81 are not wrapped within the shell 31, and may be added as a part of the rib foot beam 18 for the stiffener 8 to sit on. The support structures 80, 81 may be made from a foam material or a carbon-fibre composite material.

Each foot 32 comprises reinforcement fibres which extend continuously along the bridge 60 and cross over the beam at the intersection from the first side of the beam to the second side of the beam. Some or all of the reinforcement fibres in the foot 32 may deviate away from the panel at each end of the bridge 60. Some or all of the reinforcement fibres in the rest of the shell 31 may also deviate away from the panel at each end of the bridge 60. Each batten 40, 41 comprises reinforcement fibres which extend continuously along the bridge 60 and cross over the beam at the intersection from the first side of the beam to the second side of the beam. Some or all of the reinforcement fibres in the battens 40, 41 may deviate away from the panel at each end of the bridge.

Figure 11A:
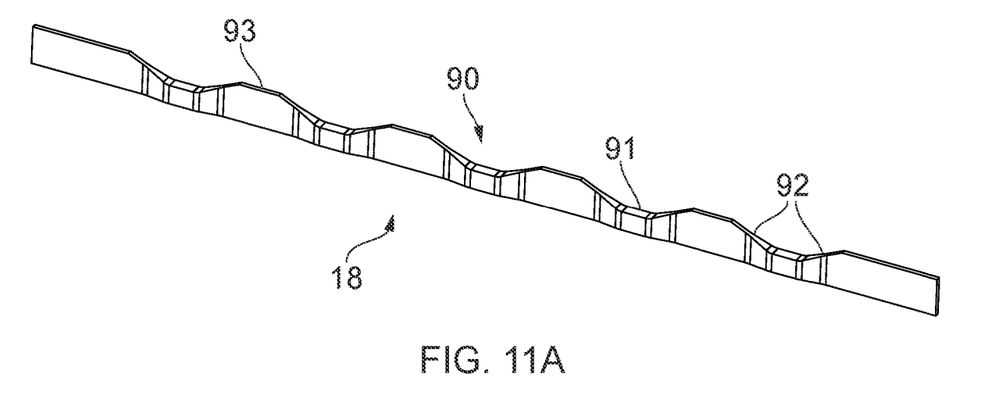
FIG. 11A shows a first embodiment of the rib foot beam.

As shown in FIG. 11A, the rib foot beam 18 has a beam recess 90 at each intersection. The beam recess 90 reduces the height of the rib foot beam 18 at the intersection so that the bridge 60 does not have to deviate too far away from the panel.

Each beam recess 90 has a base 91 and a pair of angled side walls 92. The inner surface of each bridge 60 is seated in a respective one of the beam recesses 90, in contact with the base 91.

The width of the rib foot beam 18 increases at each intersection, so the width of the rib foot beam 18 at the intersection (at the base 91 of each beam recess 90) is greater than the width of the rib foot beam 18 at the protrusions 93 between the intersections.

Figure 11B:
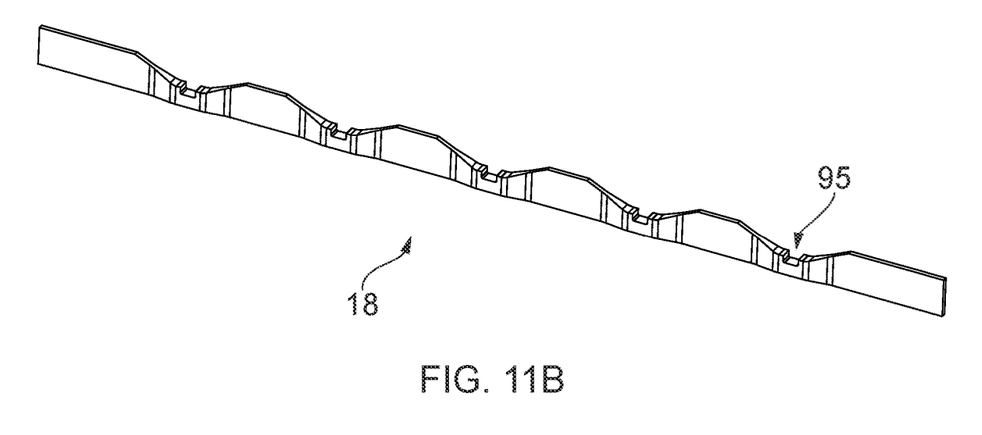
FIG. 11B shows a second embodiment of the rib foot beam.

FIG. 11B shows an alternative embodiment of the rib foot beam 18. The rib foot beam 18 in FIG. 11B is the same as the rib foot beam 18 in FIG. 11A, except the base of each beam recess has a cut-out 95 with vertical side walls. The stiffeners 8 are received in the cut-outs 95.

Each bridge 60 has a pair of side walls 34, 35 connecting the outer surface 61 to the inner surface 62. In the embodiment of FIG. 11B, the vertical side walls of the cut-out 95 contact the side walls 34, 35 of the bridge 60. This provides support for the stiffeners 8, preventing them from tipping over sideways.

Each stiffener 8 may be adhered to the panel 22 on each side of the rib foot beam 18 by either a co-bonded or co-cured joint as described above.

Similarly the rib foot beam 18 may be adhered to the panel 22 by either a co-bonded or co-cured joint.

Also, the inner surface 62 of each bridge may be adhered to the rib foot beam 18 by either a co-bonded or co-cured joint.

Figure 6:
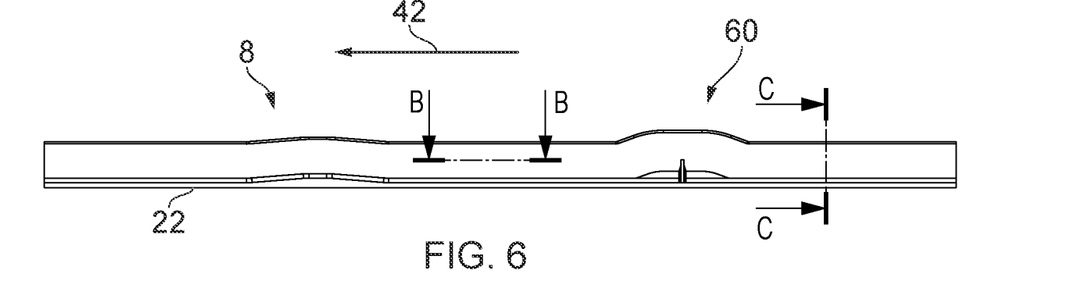
FIG. 6 is a side view of the assembly of FIG. 4.

In summary, the aircraft wing 3 comprises an upper cover panel 21; a lower cover panel 22; ribs 10, 11, 12, 13 connecting the upper cover panel to the lower cover panel; and a plurality of stiffeners 8 attached to the upper and lower cover panels. The ribs 11, 13 are joined to each cover panel 21, 22 by a respective rib/cover connection arrangement shown in FIG. 3. Each rib/cover connection arrangement comprises a rib foot beam 18 which crosses the stiffeners 8 at a series of intersections and is attached to a respective one of the ribs 11, 13 between the intersections. Each stiffener 8 deviates away from the panel at each intersection to form a respective protruding bridge 60 which crosses over the rib foot beam 18 at the intersection as shown in FIG. 4 and FIG. 6. This improves over the arrangement in WO2020/229501 since the bridge 60 can extend continuously across the intersection without any change in the cross-section of the stiffener.

Each stiffener 8 has two continuous load carrying components (battens 40, 41) that run the length of the stiffener. These battens 40, 41 have a foam component 50 between them allowing any thickness increases in the battens to be taken up inside the stiffener (foam thickness increases and decrease) to keep the outer profile remaining the same. There is a foam cap 51 on top of the stiffener to stop edge impacts to the structural plies and improve damage tolerance. Where the stiffeners 8 interlock/cross the rib foot beams 18 there is a component (interlocking supports 80, 81) to allow the structural components to sit on top. The whole stiffener 8 is then wrapped or braided.

The stiffened panels described above are covers for an aircraft wing, but the invention may be applied to other types of stiffened panel assembly for an aircraft. For example the stiffened panel assembly may form a skin of an aircraft fuselage, the fuselage comprising longerons which extend in a fore-aft direction and frames which extend circumferentially around the fuselage. In this case the longerons may have bridges which deviate from the skin and cross over the frames, or the frames may have bridges which deviate from the skin and cross over the longerons. Similarly the longerons may be formed as shown in FIG. 7, or the frames may be formed as shown in FIG. 7. In the latter case, the lengthwise direction of the stiffener is the circumferential direction of the frame.

In other embodiments, the stiffened panel assembly may be part of a different vehicle, such as a boat or spacecraft; or it may be used in something other than a vehicle.

Each stiffener 8 in the embodiments above, including the bridge 60, comprises a core 30, and a shell 31 surrounding the core. In other embodiments, each stiffener 8 (including the bridge 60) may have a different structure: for instance it may be a T-section "blade" stiffener, or an omega section "hat" stiffener.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A panel assembly comprising: a panel; a beam attached to the panel; and a plurality of stiffeners attached to the panel, wherein each stiffener comprises a respective bridge which crosses over the beam at an intersection from a first side of the beam to a second side of the beam, each bridge has an outer surface facing away from the panel and an inner surface facing towards the panel, the inner surface of each bridge deviates away from the panel to form a recess at the intersection, and the outer surface of each bridge deviates away from the panel to form a protrusion at the intersection.

2. A panel assembly according to claim 1, wherein the inner surface of each bridge follows a curved path as it deviates away from the panel.

3. A panel assembly according to claim 1, wherein each bridge has a bridge depth between its outer surface and its inner surface; and each stiffener comprises: a first stiffener portion which is attached to the panel on the first side of the beam, the first stiffener portion having a first stiffener portion depth; and a second stiffener portion which is attached to the panel on the second side of the beam, the second stiffener portion having a second stiffener portion depth, wherein the bridge depth at an apex of the protrusion is substantially the same as the first and second stiffener portion depths.

4. A panel assembly according to claim 1, wherein each stiffener comprises a core, and a shell surrounding the core.

5. A panel assembly according claim 4, wherein each shell comprises a foot with a first foot portion which is attached to the panel on the first side of the beam, a second foot portion which is attached to the panel on the second side of the beam, and a bridge foot portion which deviates away from the panel at the bridge, wherein an inner surface of the bridge foot portion provides the inner surface of the bridge.

6. A panel assembly according to claim 1, wherein each stiffener comprises a foot, and each foot comprises a first foot portion which is attached to the panel on the first side of the beam, a second foot portion which is attached to the panel on the second side of the beam, and a bridge foot portion which deviates away from the panel at the bridge, wherein the inner surface of the bridge is an inner surface of the bridge foot portion.

7. A panel assembly according to claim 1, wherein each protrusion comprises a pair of ramps, and an apex between the ramps.

8. A panel assembly according to claim 1, further comprising a first bridge support structure between the bridge and the panel on the first side of the beam; and a second bridge support structure between the bridge and the panel on the second side of the beam.

9. A panel assembly according to claim 1, wherein each bridge comprises reinforcement fibres which extend continuously along the bridge and cross over the beam at the intersection from the first side of the beam to the second side of the beam.

10. A panel assembly according to claim 1, wherein the beam comprises a plurality of beam recesses, and the inner surface of each bridge is seated in a respective one of the beam recesses.

11. A panel assembly according to claim 10, wherein each bridge has a pair of side walls connecting the outer surface to the inner surface, and the beam recess has side walls which contact the side walls of the bridge.

12. A panel assembly according to claim 1, wherein each stiffener is adhered to the panel on each side of the beam.

13. A panel assembly according to claim 1, wherein the beam is adhered to the panel.

14. A panel assembly according to claim 1, wherein the inner surface of each bridge is adhered to the beam.

15. A panel assembly according to claim 1, wherein each rib foot beam has a width which increases at each intersection so that a width of the rib foot beam at the intersections is greater than a width of the rib foot beam between the intersections.

16. An aircraft wing comprising a panel assembly according to claim 1.

17. An aircraft wing according to claim 16, wherein the panel is a first cover panel of the aircraft wing; and the aircraft wing further comprises: a second cover panel; and
 a rib connecting the first cover panel to the second cover panel, wherein the beam is a rib foot beam which is attached to the rib between the intersections.

18. An aircraft wing according to claim 16, wherein the rib foot beam is attached to the rib between the intersections by fasteners.

19. An aircraft comprising a panel assembly according to claim 1.

20. An aircraft wing comprising an upper cover panel; a lower cover panel; ribs connecting the upper cover panel to the lower cover panel; and a plurality of stiffeners attached to the upper and lower cover panels, wherein each rib is joined to each cover panel by a respective rib/cover connection arrangement, at least one of the rib/cover connection arrangements comprises a rib foot beam which crosses the stiffeners at a series of intersections and is attached to a respective one of the ribs between the intersections, wherein each stiffener deviates away from the panel at each intersection to form a respective protruding bridge which crosses over the rib foot beam at the intersection.

* * * * *